(12) United States Patent
Hosoda

(10) Patent No.: US 10,055,555 B2
(45) Date of Patent: Aug. 21, 2018

(54) IMAGE PROCESSING APPARATUS THAT PERFORMS USER AUTHENTICATION, AUTHENTICATION METHOD THEREFOR, AND STORAGE MEDIUM

(71) Applicant: CANON KABUSHIKI KAISHA, Tokyo (JP)

(72) Inventor: Yasuhiro Hosoda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 14/293,011

(22) Filed: Jun. 2, 2014

(65) Prior Publication Data

US 2014/0380462 A1  Dec. 25, 2014

(30) Foreign Application Priority Data

Jun. 25, 2013  (JP) .................................. 2013-132746

(51) Int. Cl.
- *G06F 21/00*  (2013.01)
- *G06F 21/31*  (2013.01)
- *G06F 21/60*  (2013.01)

(52) U.S. Cl.
CPC ............ *G06F 21/31* (2013.01); *G06F 21/608* (2013.01)

(58) Field of Classification Search
None
See application file for complete search history.

(56) References Cited

U.S. PATENT DOCUMENTS

| | | | |
|---|---|---|---|
| 2001/0009007 A1* | 7/2001 | Miyamae et al. | 705/52 |
| 2005/0090267 A1* | 4/2005 | Kotzin | 455/456.4 |
| 2006/0288225 A1* | 12/2006 | Jung et al. | 713/182 |
| 2007/0022299 A1* | 1/2007 | Yoshimura | G06F 21/31 713/183 |
| 2007/0083501 A1* | 4/2007 | Pedersen et al. | 707/4 |
| 2008/0120194 A1* | 5/2008 | Juras | G06Q 20/10 705/26.1 |
| 2008/0239372 A1* | 10/2008 | Okamoto | G03G 15/5075 358/1.15 |
| 2009/0112791 A1* | 4/2009 | Nakagoshi | H04N 1/00411 |

(Continued)

FOREIGN PATENT DOCUMENTS

| | | |
|---|---|---|
| JP | 2006172398 A | 6/2006 |
| JP | 2009044764 A | 2/2009 |

*Primary Examiner* — David Le
(74) *Attorney, Agent, or Firm* — Rossi, Kimms & McDowell LLP

(57) ABSTRACT

An image processing apparatus using an authentication technique that enables user authentication suited to application characteristics and user authorities, thus ensuring security and enhancing usability at the same time. An authority of a user authenticated in a first authentication process for authenticating the user is obtained. When the obtained authority of the user is a predetermined authority, control is provided to give the predetermined authority to the user authenticated in the first authentication process. When the authority of the user is not the predetermined authority, control is provided to authenticate the user in a second authentication process for authenticating the user more securely than in the first authentication process, and when the second authentication process is successful, give the obtained authority to the user.

14 Claims, 12 Drawing Sheets

(56) References Cited

U.S. PATENT DOCUMENTS

2011/0162046 A1* 6/2011 Forster .................... G06F 21/41
  726/4
2014/0289837 A1* 9/2014 Tomita ................ H04L 63/0838
  726/8

* cited by examiner

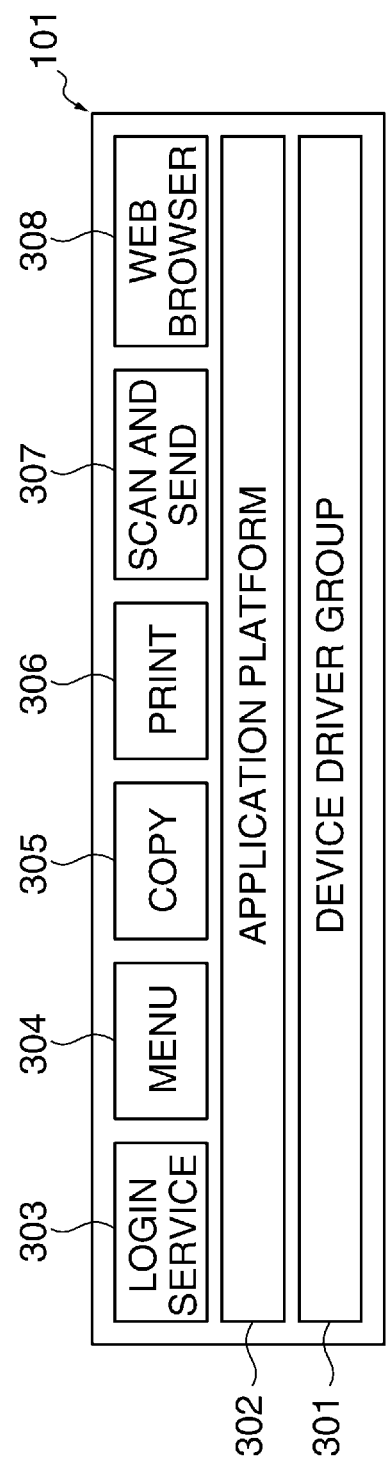

ApplicationID: 306
ApplicationName: PRINT
Funtions: ColorPrint, BwPrint, Personalize.

ApplicationID: 307
ApplicationName: SCAN AND SEND
Funtions: FAXSend, EmailSend, SMBSend, Personalize, AdministratorSetting

| NO | USER NAME | PASSWORD | ROLE |
|---|---|---|---|
| 0 | DEFAULT | NONE | GENERAL USER |
| 1 | USER 1 | ***** | GENERAL USER |
| 2 | USER 2 | ***** | ADMINISTRATOR |
| 3 | USER 3 | ***** | GENERAL USER |
| ⋮ | | | |

| NO | USER NAME | PASSWORD | ROLE |
|---|---|---|---|
| 0 | DEFAULT | NONE | COLOR PRINT DISABLED |
| 1 | USER 1 | ***** | COLOR PRINT ENABLED |
| 2 | USER 2 | ***** | COLOR PRINT ENABLED |
| 3 | USER 3 | ***** | COLOR PRINT DISABLED |
| ⋮ | | | |

| FUNCTION NAME (APPLICATION NAME) | USER AUTHENTICATION METHOD |
|---|---|
| MENU | NO AUTHENTICATION |
| COPY | NO AUTHENTICATION |
| PRINT | SIMPLE USER AUTHENTICATION |
| SCAN AND SEND | SIMPLE USER AUTHENTICATION + SECURE USER AUTHENTICATION |
| WEB BROWSER | SECURE USER AUTHENTICATION |

| FUNCTION NAME (APPLICATION NAME) | USER AUTHENTICATION METHOD |
|---|---|
| MENU | NO AUTHENTICATION |
| COPY | NO AUTHENTICATION |
| PRINT | SIMPLE USER AUTHENTICATION + SECURE USER AUTHENTICATION |
| SCAN AND SEND | SIMPLE USER AUTHENTICATION + SECURE USER AUTHENTICATION |
| WEB BROWSER | SECURE USER AUTHENTICATION |

IMAGE PROCESSING APPARATUS THAT PERFORMS USER AUTHENTICATION, AUTHENTICATION METHOD THEREFOR, AND STORAGE MEDIUM

BACKGROUND OF THE INVENTION

Field of the Invention

The present invention relates to an image processing apparatus, an authentication method therefor, and a computer-readable storage medium storing a program for implementing the authentication method, and in particular to a technique for authenticating a plurality of users who uses a plurality of functions which an image processing apparatus has.

Description of the Related Art

Image processing apparatuses such as MFPs (Multifunction Peripherals) have a plurality of applications such as copy, print, and scan and send so as to realize a plurality of functions such as copying, printing, and sending of scanned-in images. Many image processing apparatuses are shared by a plurality of users and thus have a user authentication function from a security standpoint. With this user authentication function, users can be identified to carry out access control and personalization control on a user-by-user basis.

Exemplary access control on a user-by-user basis sets authorities to use an image processing apparatus (such as enabling and disabling of color copying) for an administrator and a general user and limits available functions according to the set authorities. For user authentication used for the purpose of access control, there are an authentication method using user IDs ad passwords and a strict authentication method using IC cards and/or biological information so as to prevent spoofing.

On the other hand, exemplary personalizing control displays functions which an authenticated user frequently uses, or displays only jobs of an authenticated user among print jobs retained in an image processing apparatus and prompts a user to make a choice. This function is referred to as a personalizing function or personalization.

There is also a technique in which according to a security level associated with an application selected from a plurality of applications, it is determined whether or not authentication is required so as to use the application, and when authentication is necessary, user authentication is performed (see Japanese Laid-Open Patent Publication (Kokai) No. 2006-172398). For example, an application having a copy function is configured to require no user authentication so that all users can use the application, whereas an application having a function of sending scanned-in images is configured to require user authentication from a security standpoint.

There is also a technique in which there is a plurality of input means for inputting user information, and whether or not to execute a job is determined according to user information input using the input means (see Japanese Laid-Open Patent Publication (Kokai) No. 2009-44764).

In the personalizing control described above, when the strict authentication method is used, time-consuming operations are required so as to perform user authentication. It is thus desirable to, for an application that does not require security and can be personalized, use a simple authentication method intended to identify users.

There is, however, an application that can be personalized and requires security. Examples of the application include those having characteristics below.

When a general user uses an application, the application can be personalized and used by everyone, but changing of settings on the application is disabled.

When an administrator uses an application, the application can be personalized and used by everyone, and changing of settings on the application is enabled.

If strict user authentication is required to use applications having the above characteristics, strict user authentication must be performed for even a general user who is inhibited from changing settings on the applications, and hence time-consuming operations are needed, which is troublesome. On the other hand, if the simple authentication method is used for an administrator as well as for the above applications, this will present a problem from a security standpoint.

SUMMARY OF THE INVENTION

The present invention provides an image processing apparatus using an authentication technique that enables user authentication suited to application characteristics and user authorities, thus ensuring security and enhancing usability at the same time, an authentication method therefor, and a computer-readable storage medium storing a program for implementing the authentication method.

Accordingly, a first aspect of the present invention provides an image processing apparatus comprising an authentication unit configured to carry out a first authentication process for authenticating a user and a second authentication process for authenticating the user more securely than in the first authentication process, an obtaining unit configured to obtain an authority of the user authenticated in the first authentication process, and a control unit configure to, when the authority of the user obtained by the obtaining unit is a predetermined authority, provide control to give the predetermined authority to the user authenticated in the first authentication process, and when the authority of the user obtained by the obtaining unit is not the predetermined authority, provide control to carry out the second authentication process for the user, and when the second authentication process is successful, give the authority obtained by the obtaining unit to the user.

Accordingly, a second aspect of the present invention provides a control method for an image processing apparatus comprising an obtaining step of obtaining an authority of a user authenticated in a first authentication process for authenticating the user, and a control step of, when the authority of the user obtained in the obtaining step is a predetermined authority, providing control to give the predetermined authority to the user authenticated in the first authentication process, and when the authority of the user obtained in the obtaining step is not the predetermined authority, providing control to authenticate the user in a second authentication process for authenticating the user more securely than in the first authentication process, and when the second authentication process is successful, give the authority obtained in the obtaining step to the user.

Accordingly, a third aspect of the present invention provides a non-transitory computer-readable storage medium storing a program for causing an image processing apparatus to implement a control method, the control method comprising an obtaining step of obtaining an authority of a user authenticated in a first authentication process for authenticating the user, and a control step of, when the authority of the user obtained in the obtaining step is a predetermined authority, providing control to give the predetermined authority to the user authenticated in the first authentication process, and when the authority of the user obtained in the obtaining step is not the predetermined authority, providing control to authenticate the user in a second authentication process for authenticating the user more securely than in the first authentication process, and when the second authentication process is successful, give the authority obtained in the obtaining step to the user.

According to the present invention, user authorities are obtained from information on identified users, and authentication methods with different security strengths are used based on the user authorities. This enables user authentication suited to application characteristics and user authorities, thus ensuring security and enhancing usability at the same time.

Further features of the present invention will become apparent from the following description of exemplary embodiments (with reference to the attached drawings).

BRIEF DESCRIPTION OF THE DRAWINGS

FIG. 3 is a block diagram schematically showing a software arrangement of the MFP in FIG. 1.

FIGS. 4A and 4B are views showing exemplary information which a login context has, in which FIG. 4A shows information on a user 1, and FIG. 4B shows information on a user 2.

FIGS. 5A, 5B, and 5C are views showing exemplary operation screens displayed on an operation unit, in which FIG. 5A shows a menu screen, FIG. 5B shows a print screen, and FIG. 5C shows a scan and send screen.

FIGS. 6A and 6B are views showing exemplary manifest files, in which FIG. 6A shows a print manifest file, and FIG. 6B shows a scan and send manifest file.

FIGS. 7A, 7B, and 7C are views showing exemplary authentication screens displayed on the operation unit, in which FIG. 7A shows a simple user authentication screen, FIG. 7B shows a first secure user authentication screen, and FIG. 7C shows a second secure user authentication screen.

FIGS. 8A to 8D are views showing exemplary table information for use in selecting an application, in which FIGS. 8A and 8B show user information tables, and FIGS. 8C and 8D show user authentication setting tables.

DESCRIPTION OF THE EMBODIMENTS

The present invention will now be described in detail with reference to the drawings showing embodiments thereof.

Figure 1:
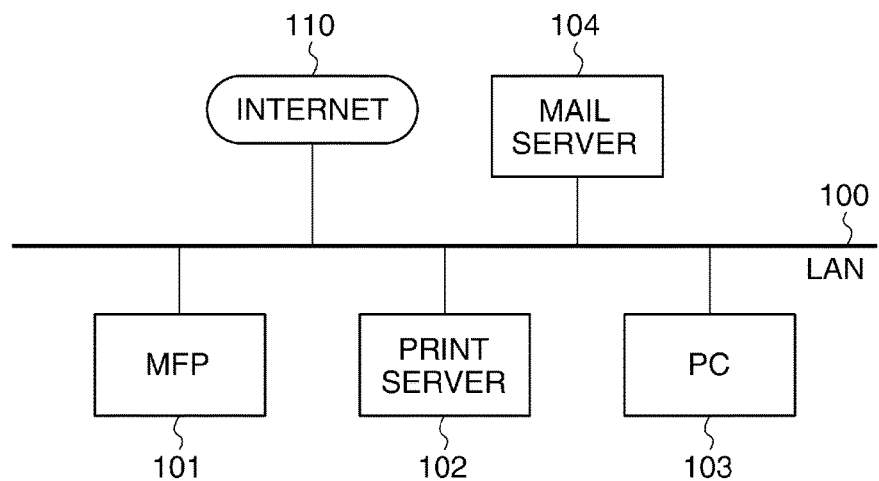
FIG. 1 is a diagram showing an exemplary network environment in which an image processing apparatus according to a first embodiment of the present invention is placed.

FIG. 1 is a diagram showing an exemplary network environment in which an MFP 101 which is an image processing apparatus according to a first embodiment of the present invention is placed.

The MFP 101 is a multifunctional peripheral having a plurality of functions such as a copy function, a print function, a scanner function, and a network communication function. The MFP 101 is connected to a LAN 100 to which a printer server 102, a PC (personal computer) 103, and a mail server 104 are connected. The LAN 100 is connected to the Internet 110.

In the PC 103, print jobs are created by a user. Print jobs transmitted from the PC 103 are retained in the print server 102. The MFP 101 accesses the print server 102 in accordance with an instruction from a user and obtains a desired print job from the print server 102. In the MFP 101, printing of the print job obtained from the print server 102 is performed.

The MFP 101 sends image data read by the scan function to the mail server 104 via the LAN 100. The PC 103 is able to obtain image data stored in the mail server 104 and makes it available to a user. Further, the mail server 104 is also able to send the image data to a PC, not shown, connected to the Internet 110.

Figure 2:
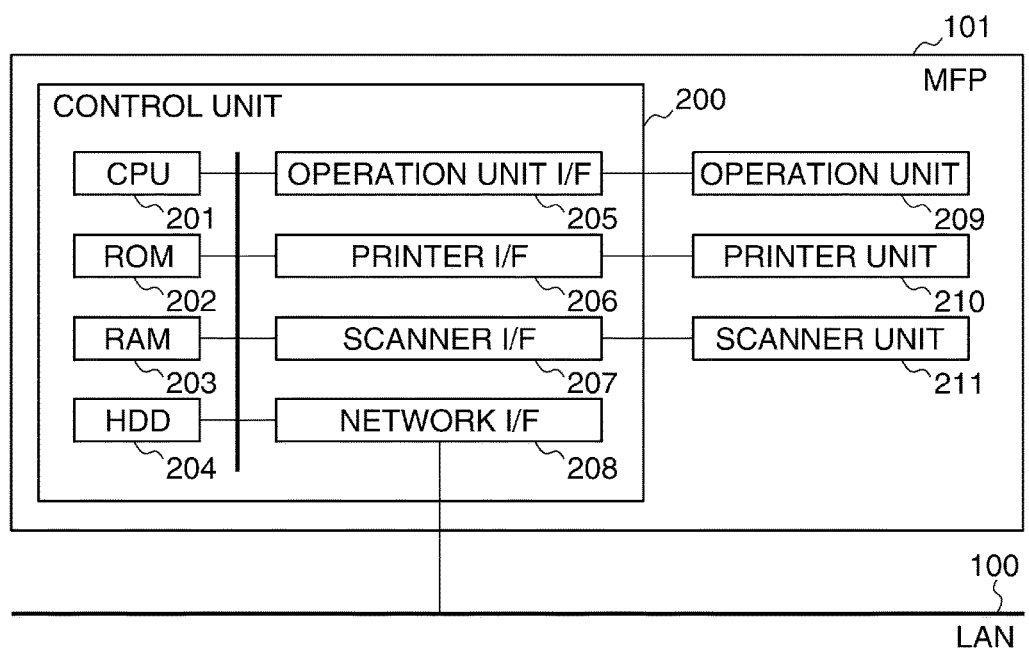
FIG. 2 is a block diagram schematically showing a hardware arrangement of an MFP in FIG. 1.

FIG. 2 is a block diagram schematically showing a hardware arrangement of the MFP 101 in FIG. 1.

A control unit 200 including a CPU 201 controls the overall operation of the MFP 101. The CPU 201 reads out control programs stored in a ROM 202 and carries out a variety of control such as reading control and transmission control. A RAM 203 is used as a temporary storage area such as a main memory, a work area, and so on for the CPU 201. An HDD 204 stores image data and various programs. An operation unit I/F 205 is an interface (I/F) that controls exchange of information between an operation unit 209 and the control unit 200.

A printer I/F 206 is an I/F that controls exchange of information between a printer unit 210 and the control unit 200. The printer unit 210 prints image data, which is transferred from the control unit 200 via the printer I/F 206, on a recording medium.

A scanner I/F 207 is an I/F that controls exchange of information between a scanner unit 211 and the control unit 200. The scanner unit 211 reads an image off an original to generate image data and outputs the generated image data to the control unit 200 via the scanner I/F 207.

A network I/F 208 is a communication I/F that controls exchange of information between the control unit 200 and the LAN 100. The network I/F 208 sends image data and information to and receives a variety of information from the print server 102, the PC 103, and so forth on the LAN 100.

It should be noted that in the present embodiment, one CPU 201 in the MFP 101 carries out processes in flowcharts, to be described later, using one memory (the RAM 203 or the HDD 204), but the present invention may be in another form. For example, a plurality of CPUs or a plurality of RAMs or HDDs may collaborate with each other to carry out the processes in the flowcharts.

FIG. 3 is a block diagram schematically showing a software arrangement of the MFP 101 in FIG. 1. Blocks in FIG. 3 are software modules which are stored in the ROM 202 or the HDD 204 of the MFP 101 and executed by the CPU 201 to realize predetermined functions explained hereafter.

A device driver group 301 is for controlling a variety of hardware in the MFP 101 described above.

An application platform 302, for example, installs, uninstalls, starts, and shuts down applications (hereafter sometimes referred to merely as "apps") and services, and controls screens displayed on the operation unit 209. The application platform 302 also offers APIs (Application Programming Interfaces) below to the apps and the services.

An API for exchanging data between an application and a service

An API for using functions of hardware from an application or a service via the device driver group 301

The application platform 302 may include an operating system (OS) such as Linux (registered trademark), a virtual machine such as JAVA (registered trademark), or an OSGi framework. It should be noted that the OSGi framework is a JAVA (registered trademark)-based service platform defined by OSGi Alliance (standards body).

A login service 303 is a service that authenticates a user who uses the MFP 101 and applications running on the MFP 101. The login service 303 has functions below.

Managing a default role. In the present embodiment, an authority to use an MFP which can be used without user authentication is referred to as the default role. The default role is configured to be changeable.

Displaying a user interface (UI), which is for authenticating a user, on the operation unit 209 and performing user authentication. A detailed description of the UI displayed on the operation unit 209 will be given later.

Managing a user information table and a user authentication setting table. A detailed description of the table information will be given later.

Generating, on the RAM 203, an object called a login context indicative of information on a user who has been successfully authenticated, and notifying the application platform 302 and an application of the login context via an API. In the present embodiment, the sequential process from user authentication to notification of a login context is referred to as a login process.

Figure 4A:
Figure 4B:

FIGS. 4A and 4B show exemplary login contexts. FIG. 4A shows an exemplary login context 601 when a user 1 who is a general user logs in. FIG. 4B shows an exemplary login context 602 when a use 2 who is an administrator logs in.

Figure 5A:
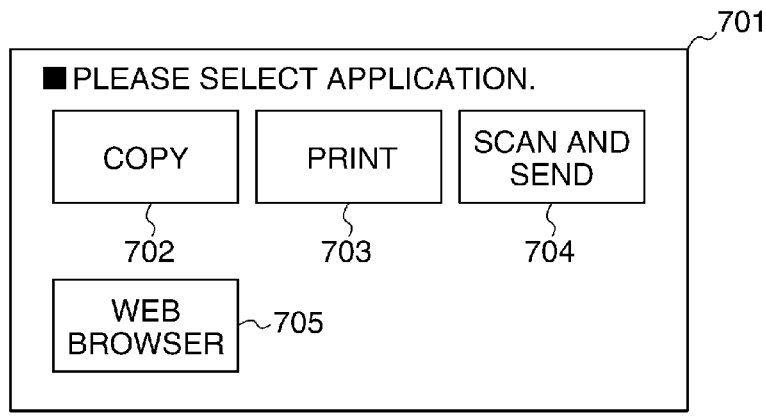

A menu 304 is a service that displays a menu screen 701 shown in FIG. 5A on the operation unit 209. For example, a plurality of buttons 702, 703, 704, and 705 for selecting applications to be used by a user is displayed on the menu screen 701. It should be noted that types of the applications are not limited to those shown in the figure.

A copy 305, a print 306, a scan and send 307, and a web browser 308 are applications running on the MFP 101. Each of these applications has a manifest file in which application information and application characteristics are described. The manifest file is used for the application platform 302 to control execution of an application. In general, MANIFEST.MF file define by OSGi is known. FIGS. 6A and 6B show exemplary manifest files.

FIG. 6A shows an exemplary manifest file 801 which the print 306 has. As function attributes (Functions) in a manifest file, functions which an application has are described. For example, the manifest file 801 shows that the print 306 has a color print function (ColorPrint), a monochrome print function (BwPrint), a personalizing function (Personalize). The personalizing function and personalization are generic names for the function of displaying functions which an authenticated user frequently uses, the function of displaying only jobs of an authenticated user among print jobs retained in the image processing apparatus and prompting the user to make a choice, and so on.

FIG. 6B shows an exemplary manifest file 802 which the scan and send 307 has. As function attributes (Functions), the manifest file 802 shows that the scan and send 307 has a facsimile sending function (FAXSend) and a mail sending function (EmailSend). The manifest file 802 also shows that the scan and send 307 has a file sending function using SMB protocol (SMBSend), a personalizing function (Personalize), and an administrator setting function (AdministratorSetting).

Figure 7A:
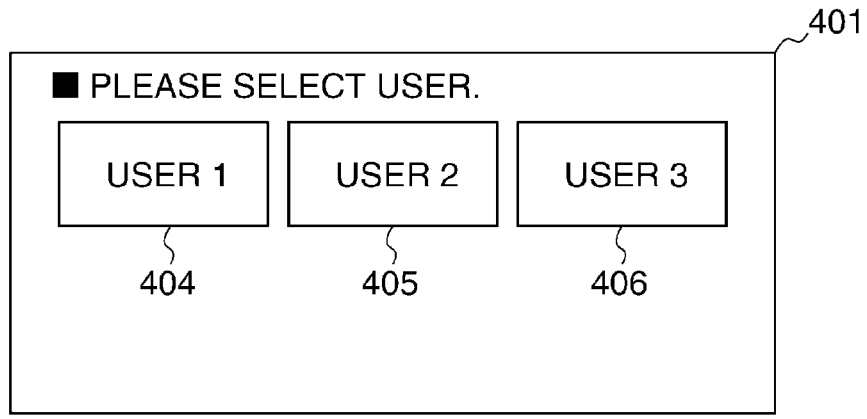
Figure 7B:
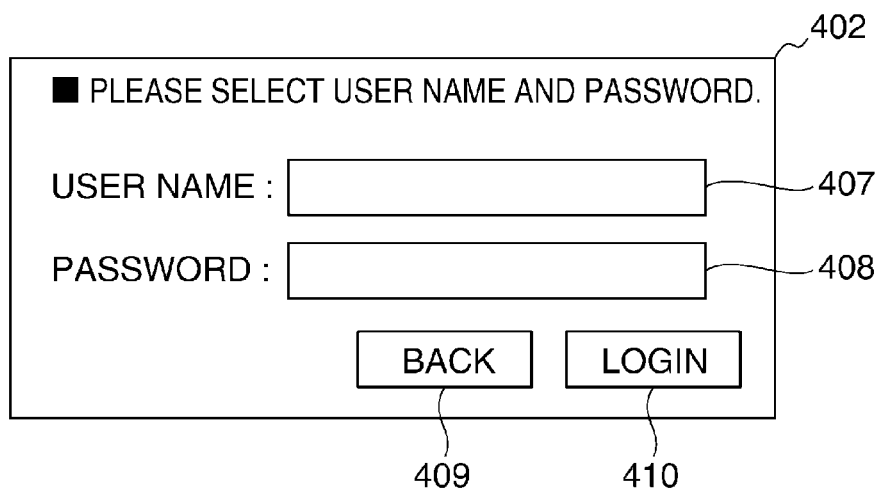
Figure 7C:
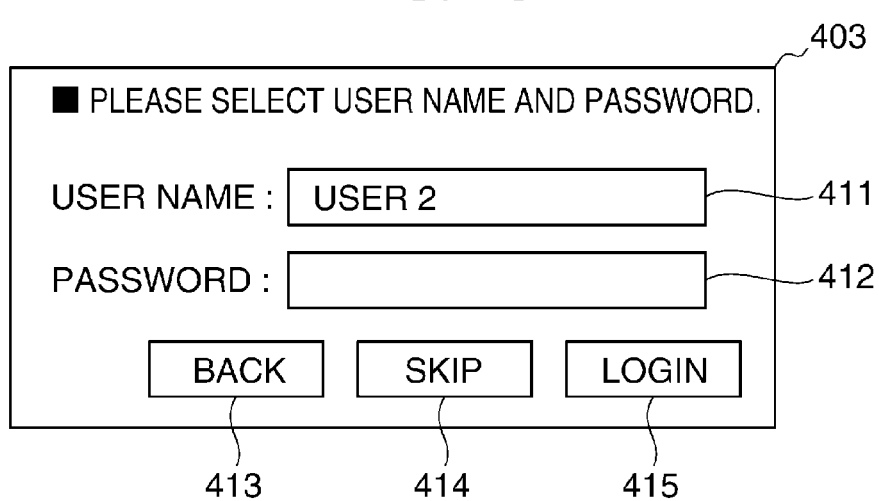

Referring next to FIGS. 7A to 7C, a description will be given of authentication screens (UI) for authenticating a user, which are displayed on the operation unit 209 by the login service 303.

FIG. 7A shows an exemplary simple user authentication screen, FIG. 7B shows an exemplary first secure user authentication screen, and FIG. 7C shows an exemplary second secure user authentication screen.

Referring to FIG. 7A, a simple user authentication screen 401 is an authentication screen for identifying users who use the MFP 101. User selecting buttons 404, 405, and 406 associated with users who have already been registered in a user information table, to be described later, are placed on the simple user authentication screen 401. When a user selects and depresses a button corresponding to himself/herself, user authentication is performed in a simple way.

Referring to FIG. 7B, a first secure user authentication screen 402 is an authentication screen for performing secure user authentication by causing a user to enter a user name and a password. A user name input section 407, a password input section 408, a back button 409, and a login button 410 are placed on the first secure user authentication screen 402. When a user enters a user name into the user name input section 407, enters a password into the password input section 408, and then depresses the login button 410, secure user authentication is performed based on the input user name and password.

Referring to FIG. 7C, a second secure user authentication screen 403 is an authentication screen that is displayed when a user (for example, an administrator) who has an authority (role) with higher security strength than the default role is selected on the simple user authentication screen 401, so that user authentication of the administrator can be performed. Namely, for an administrator, simple user authentication is performed on the simple user authentication screen 401, and then secure user authentication is performed on the second secure user authentication screen 403.

A user name input section 411, a password input section 412, a back button 413, a skip button 414, and a login button 415 are placed on the second secure authentication screen 403. When the second secure user authentication screen 403 is displayed, simple user authentication has already finished, and hence a user name has been entered into the user name input section 411. After that, when a password is entered into the password input section 412, and the login button 415 is depressed, secure user authentication is performed based on the input user name and password. It should be noted that when the skip button 414 is depressed, secure user authentication can be skipped (omitted).

Referring next to FIGS. 8A to 8D, a description will be given of user information tables and user authentication setting tables managed by the login service 303.

FIGS. 8A and 8B show user information tables, and FIGS. 8C and 8D show user authentication setting tables.

Referring to FIGS. 8A and 8B, user names, passwords, and roles indicative of user's authorities to use the MFP 101

(an administrator or a general user, and color print enabled or disabled), and so on which are for use in user authentication are registered as user information in user information tables 501 and 502. An administrator who administrates the MFP 101 can register the information in advance in the HDD 204 via a UI (not shown) displayed by the login service 303. It should be noted that the user information table 501 is used in the present embodiment, and the user information table 502 is used in a third embodiment, to be described later. Also, in the description of the present invention, two types of user information tables consisting of the user information tables 501 and 502 are used, but a combination of these two types of user information tables may be used.

The user information tables in FIGS. 8A and 8B may not be stored in the HDD 204 of the MFP 101 but may be stored in an authentication server (not shown) connected to the LAN 100. In this case, the login service 303 requests authentication from the authentication server (when necessary, a user name and a password are transmitted to the authentication server). The login service 303 then receives an authentication result from the authentication server.

Referring to FIG. 8C, function names (application names) and user authentication methods are registered in a user authentication setting table 503. The user authentication setting table 503 is information indicative of the correspondence relationship between applications and user authentication methods. The function names (application names) are the above described copy 305, print 306, scan and send 307, web browser 308, and so on. The user authentication methods registered in the user authentication setting table 503 are no authentication, simple user authentication (first authentication), secure user authentication (second authentication), and simple user authentication+secure user authentication.

The login service 303 obtains information on applications of the MFP 101 from an API of the application platform 302. The login service 303 displays a UI (not shown) for associating user authentication methods with menus and applications in the user authentication setting table 503. By way of this UI, an administrator can register the user authentication setting table 503 in the HDD 204 and edit the user authentication setting table 503.

When a button for an application displayed on the menu screen 701 is depressed in a case where "no authentication" is set for "menu" in the user authentication setting table 503, user authentication is performed using a user authentication method set for this application. Further, when "no authentication" is set as user authentication methods for applications, a user can use the applications from the menu screen 701 without user authentication. It should be noted that the default role is applied to an authority of a user when he or she uses an application for which "no authentication" is set.

In a case where a user authentication method other than "no authentication" is set for "menu" in the user authentication setting table 503, a default display screen displayed on the operation unit 209 is a user authentication screen. In this case, after a login process is completed, a menu or application can be used with an authority of an authenticated user.

It should be noted that as with the user authentication setting table 503, function names (application names) and user authentication methods are registered in a user authentication table 504 shown in FIG. 8D. A description will be given later of the user authentication table 504 with description of the third embodiment.

Figure 5B:
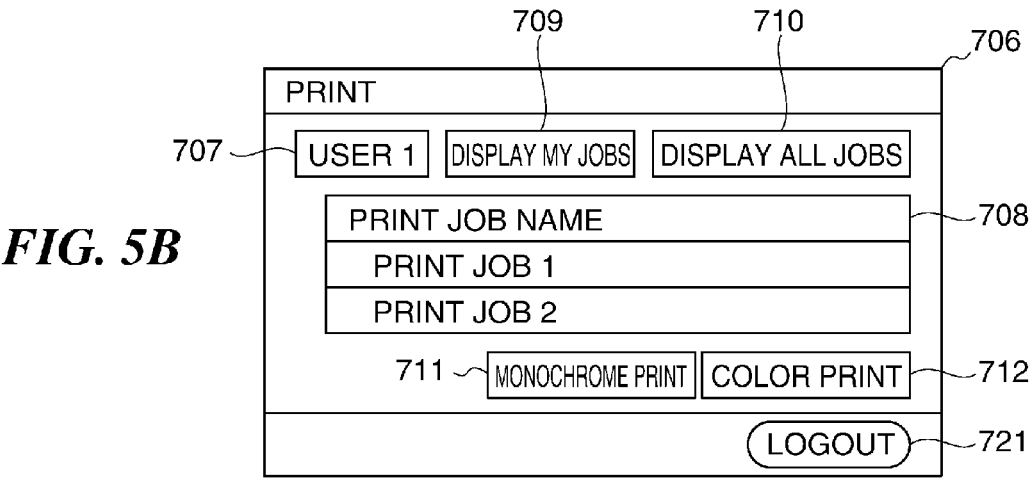

Referring next to FIG. 5B, a description will be given of functions which the print 306 has.

FIG. 5B is a view showing an exemplary application screen displayed on the operation unit 209 displayed by the print 306.

The print 306 is an application that displays my jobs retained in the print server 102 (print jobs associated with a login user) and causes the printer unit 210 to perform printing based on a selected print job.

A login user name display section 707 in which a name of a user who is logging in, and a job list display section 708 in which a list of print jobs obtained from the print server 102 by the print 306 are placed on the print screen 706 in FIG. 5B. A my job display button 709 is a button for displaying jobs of a user who is logging in, that is, my jobs in the job list display section 708. An all job display button 710 is a button for displaying all jobs including jobs of others in the job list display section 708. A monochrome print button 711 is a button for printing a selected job in black and white. A color print button 712 is a button for printing a selected job in color. For example, the print 306 obtains an authority (role) of a user who is logging in from a login context, and when the obtained user's authority indicates that color print is disabled, the print 306 disables the color print button 712 (give role).

Figure 5C:
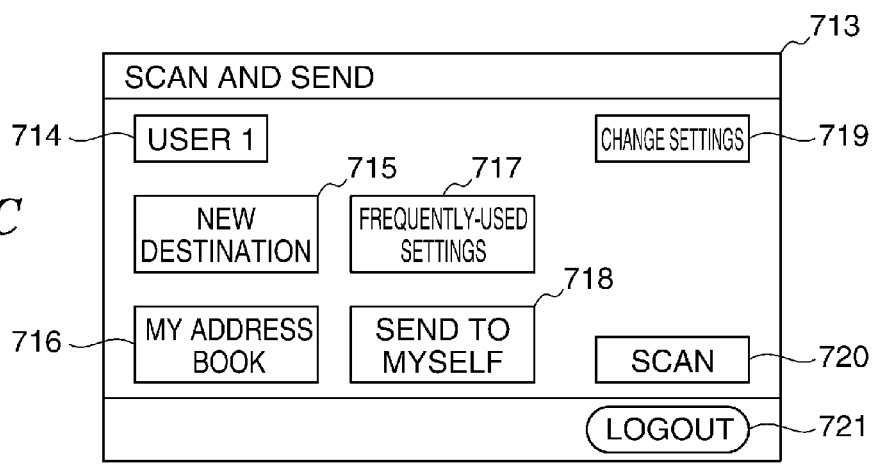

Referring next to FIG. 5C, a description will be given of functions which the scan and send 307 has.

FIG. 5C is a view showing an exemplary application screen displayed on the operation unit 209 displayed by the scan and send 307.

The scan and send 307 is an application that sends data of an image, which is scanned in by the scanner unit 211, to an external apparatus.

A login user name display section 714 in which a name of a user who is logging in is displayed, and a new destination button 715 for shifting to a screen via which a transmission destination (new destination) of image data is input are placed on a scan screen 713 shown in FIG. 5C. A my address book button 716 is a button for using an address book in which transmission destinations which a user who is logging in frequently uses are registered. A frequently-used setting button 717 is a button for using scan settings frequently used by a user who is logging in. A send to oneself button 718 is a button for using a mail address of a user who is logging in as a transmission destination of image data. It should be noted that the my address book button 716, the frequently-used setting button 717, and the send to oneself button 718 have a personalizing function. The scan and send 307 manages data for the my address book button 716, the frequently-used setting button 717, and the send to oneself button 718 in association with user names.

A setting change button 719 is a button for changing operation settings on the scan and send 307. By depressing the setting change button 719, transmission protocols allowed to be used by a general user by the scan and send 307 can be set. The setting change button 719 is a button for an administrator. Thus, when a general user logs in, the scan and send 307 controls access by disabling the setting change button 719 so as to inhibit depression thereof. A scan button 720 is a button for carrying out scanning and transmission.

A logout button 721 in FIGS. 5B and 5C is a button for logging out of an application in which a user is logging. When the logout button 721 is depressed, a logout process is carried out. In the logout process, a login context for the user who is logging in is discarded, and the screen displayed on the operation unit 209 is put back to an initial state before the user starts operation.

Referring next to FIGS. 9A, 9B, 10, 11, and 12, a description will be given of how an authentication function required for a user to use an application is made available in the MFP 101.

Figure 9A:
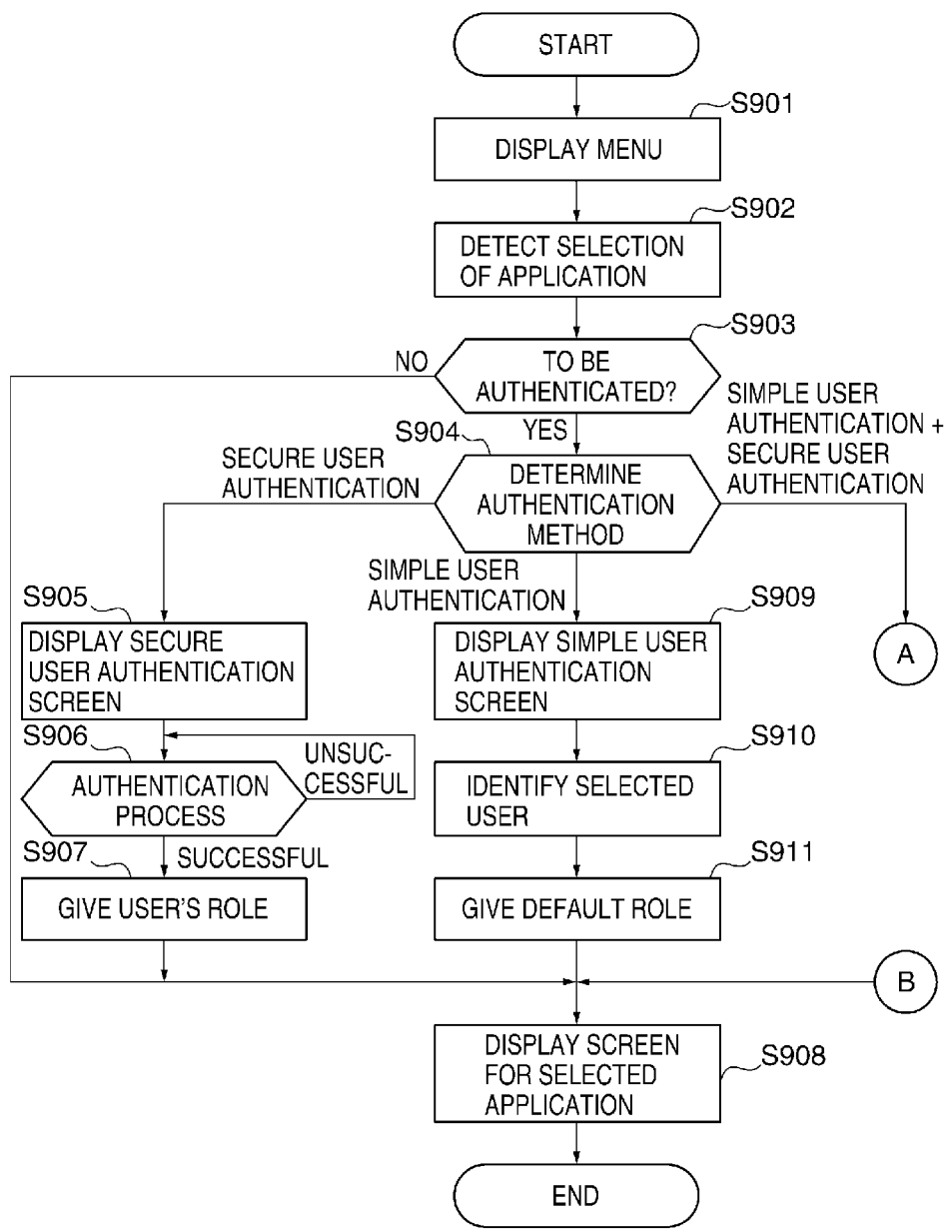
FIGS. 9A and 9B are flowcharts showing the flow of a process in which an application for the MFP is selected.
Figure 9B:
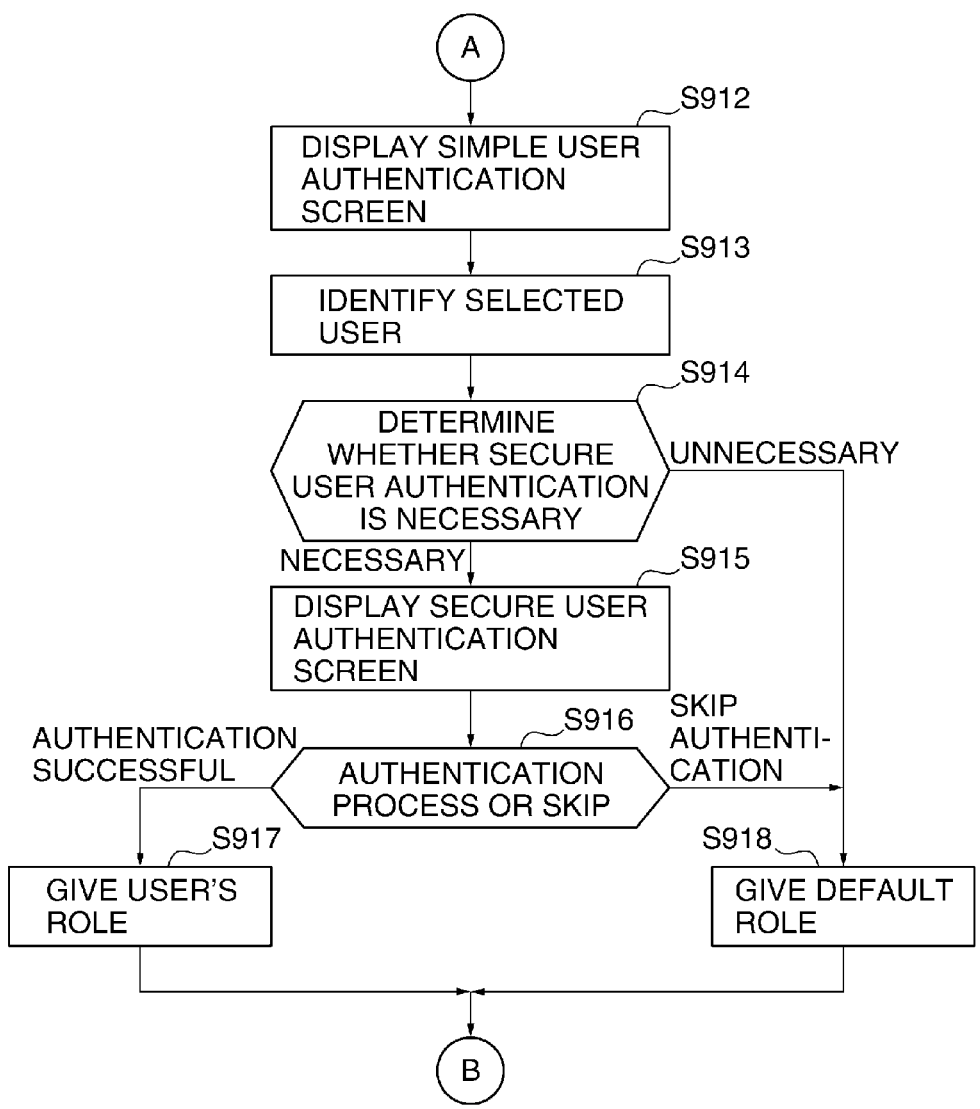

FIGS. 9A and 9B are flowcharts showing the flow of a process in which an application for the MFP 101 is selected. The illustrated process is realized by the CPU 201 of the MFP 101 executing any of the software shown in FIG. 3. In this process, the user information table 501 and the user authentication setting table 503 are used, and the default role indicates a general user.

Referring to FIG. 9A, the application platform 302 refers to the user authentication setting table 503, and because "no authentication" is set as an authentication method for "menu", displays the menu screen 701 in FIG. 5A as a default operation screen (step S901).

Next, upon detecting depression of a button for any application on the menu screen 701, the application platform 302 notifies the login service 303 of information on the selected application via an API (step S902).

The login service 303 then refers to the user authentication setting table 503 and determines whether or not user authentication is set for the selected application (step S903). When user authentication is not set for the selected application (NO in the step S903), the process proceeds to step S908, in which the login service 303 in turn notifies the application platform 302 that authentication is unnecessary. The application platform 302 then notifies the selected application of the default role and displays a screen for the selected application on the operation unit 209 (step S908) and terminates the process. In the following description, a screen for an application is, for example, a screen shown in FIG. 5B or FIG. 5C.

On the other hand, when user authentication is set for the selected application (YES in the step S903), the process proceeds to step S904. In the step S904, the login service 303 refers to the user authentication setting table 503 and determines a user authentication method for the selected application. When secure user authentication is set for the selected application, the process proceeds to step S905. When simple user authentication is set for the selected application, the process proceeds to step S909. When simple user authentication+secure user authentication is set for the selected application, the process proceeds to step S912 in FIG. 9B.

In the step S905, the login service 303 displays the first secure user authentication screen 402. Next, upon detecting depression of the login button 410 after a user name is entered into the user name input section 407, and a password is entered into the password input section 408, the login service 303 carries out a user authentication process (step S906). In the user authentication process, the login service 303 refers to the user information table 501, and when the input user name and password are registered in the user information table 501, determines that user authentication is successful. When user authentication is successful (successful in the step S906), the login service 303 obtains role information on the authenticated user from the user information table 501 and stores the role information as well as the user name in a login context (step S907). The login service 303 notifies the application platform 302 of the login context and completion of the authentication process, and the application platform 302 displays a screen for the selected application (step S908) and terminates the process.

In the step S909, the login service 303 displays the simple user authentication screen 401. Next, upon detecting depression of a button for any user on the simple user authentication screen 401, the login service 303 identifies a user associated with the button (step S910).

The login service 303 then stores a user name of the identified user and the default role in the login context (step S911). The login service 303 notifies the application platform 302 of the login context and completion of the authentication process, and the application platform 302 displays a screen for the selected application (step S908) and terminates the process. For example, the print 306 obtains the user name from the provided login context and offers a personalizing function for the obtained user.

In the step S912 in FIG. 9B, the login service 303 displays the simple user authentication screen 401. Next, upon detecting depression of a button for any user on the simple user authentication screen 401, the login service 303 identifies a user associated with the button (step S913).

The login service 303 then determines whether or not secure user authentication is necessary based on information on the selected application and information on the identified user (step S914). A detailed description of the step S914 will be given later.

When the login service 303 determines in the step S914 that secure user authentication is necessary, the process proceeds to step S915. On the other hand, when the login service 303 determines in the step S914 that secure user authentication is unnecessary, the process proceeds to step S918.

In the step S915, the login service 303 displays the second secure user authentication screen 403 to request secure authentication of the user. At this time, the login service 303 displays the second secure user authentication screen 403 with the user name of the user identified in the step S913 entered in the user name input section 411 on the second secure user authentication screen 403. Then, when the user enters the password into the password input section 412, and the login service 303 detects depression of the login button 415, the login service 303 carries out a user authentication process (step S916). When user authentication is successful, the login service 303 refers to the user information table 501 and obtains role information on the authenticated user, and stores the role information as well as the user name in the login context (step S917), followed by the process proceeding to the step S908 in FIG. 9A. On the other hand, when the login service 303 detects the user depressing the skip button 414 on the second secure user authentication screen 403 in the step S916, the process proceeds to the step S918.

In the step S918, the login service 303 stores, in the login context, the user name of the user identified in the step S913 and the default role, and the process proceeds to the step S908 in FIG. 9A.

In the step S908, the login service 303 notifies the application platform 302 of the login context and completion of the authentication process, and the application platform 302 displays a screen for the selected application and terminates the present process. For example, the scan and send 307 obtains a user name from the provided login context and offers a personalizing function for the obtained user. Further, when role information obtained from the login context is indicative of a general user, the scan and send 307 disables the setting change button 719, which is a button for an administrator, to inhibit depression thereof. On the other hand, when role information obtained from the login context is indicative of an administrator, the scan and send 307 enables the setting change button 719 to allow depression thereof.

Figure 10:
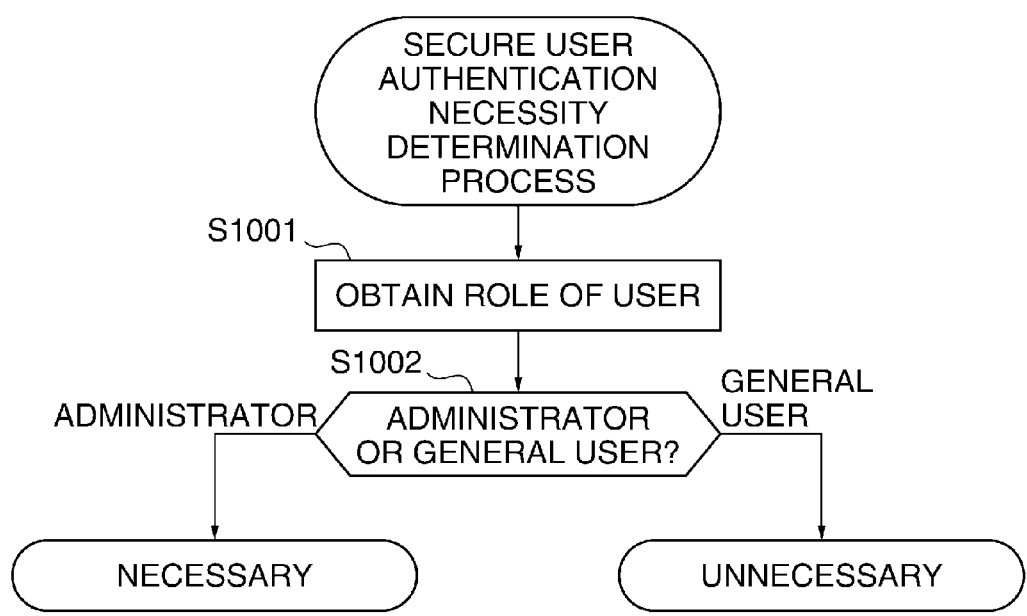
FIG. 10 is a flowchart showing in detail a process in which whether or not secure user authentication is necessary is determined in step S914 in FIG. 9B.

Referring next to FIG. 10, a detailed description will be given of a process in which whether or not secure user authentication is necessary is determined in the step S914 in FIG. 9B.

FIG. 10 is a flowchart showing in detail the process in which whether or not secure user authentication is necessary is determined in step S914 in FIG. 9B.

Referring to FIG. 10, the login service 303 refers to the user information table 501 and obtains role information on the user identified in the step S913 (step S1001).

The login service 303 then determines whether or not the security strength of an authority indicated by the obtained role information on the user is higher than that of the default role (step S1002). Specifically, the role information on the user obtained in the step S1001 and the default role are compared with each other. In the present embodiment, the default role is a general user. When the obtained role information on the user is indicative of an administrator, the security strength of the authority indicated by the role information is higher than that of the default role, and hence the login service 303 determines that secure user authentication is necessary. On the other hand, when the obtained role information on the user is indicative of a general user, the security strength of the authority indicated by the role information is equal to that of the default role, and hence the login service 303 determines that secure user authentication is unnecessary.

According to the arrangement described above, when an administrator depresses a user selection button for himself/herself on the simple user authentication screen 401, the second secure user authentication screen 403 is displayed. This prevents a general user from impersonating an administrator and accessing functions for an administrator, thus ensuring security. On the other hand, when a general user depresses a button for himself/herself, a personalizing function of an application can be used without displaying the second secure user authentication screen 403, and hence convenience for a general user is never compromised. Further, because an administrator can skip input of a password by depressing the skip button 414 on the second secure user authentication screen 403, input of authentication information which is time-consuming can be skipped even when only a personalizing function of an application is used.

According to the first embodiment described above, user authentication suited to application characteristics and user authorities can be provided to ensure security and enhance usability at the same time. Moreover, only simple user authentication can be provided for a general user having the default role, and this eliminates the inconvenience of user authenticating operations. Further, strict user authentication can be provided for an administrator who has an authority with high security strength, and hence a certain level of security can be ensured. Moreover, only simple authentication can be provided for an application which does not require an authority with high security strength during operation, and hence even for a user who has an authority with high security strength, the inconvenience of user authentication operations can be eliminated.

A description will now be given of a second embodiment of the present invention.

Because it is unnecessary to perform secure user authentication for an application that does not have such an administrator function as to allow only an administrator to change settings on the application, it is useless to always display a secure user authentication screen. Thus, the second embodiment of the present invention differs from the first embodiment described above in that when an application that does not have an administrator function is selected, a secure user authentication screen is not displayed.

Figure 11:
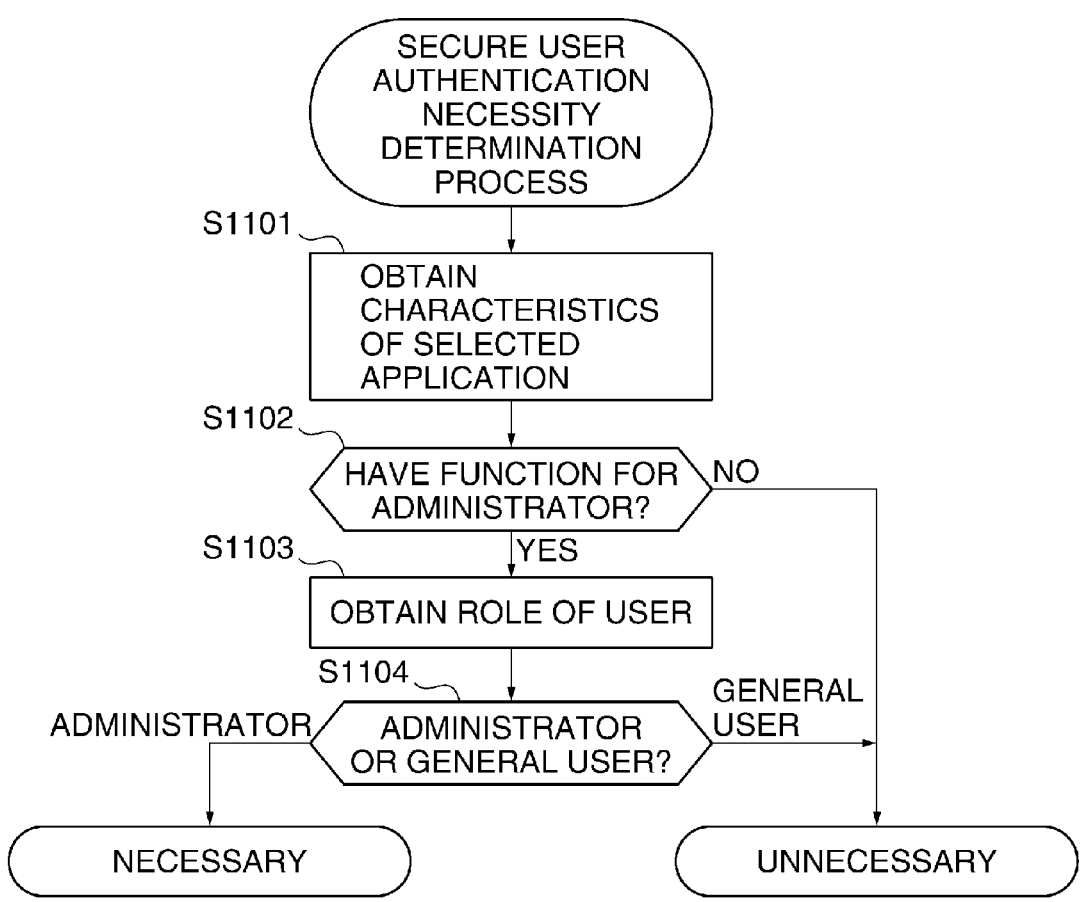
FIG. 11 is a flowchart showing in detail a process in which whether or not secure user authentication is necessary is determined according to a second embodiment of the present invention.

FIG. 11 is a flowchart showing in detail a process in which whether or not secure user authentication is necessary is determined according to the second embodiment of the present invention. This process is a detailed process in the step S914 in FIG. 9B, and differs from the process in FIG. 10 in that steps S1101 and S1102 are added. Otherwise, this process is the same as that of the first embodiment described above, and description thereof is omitted.

Referring to FIG. 11, the login service 303 obtains characteristics of the application selected in the step S902 in FIG. 9A (step S1101: characteristic obtaining unit). Specifically, the login service 303 obtains a manifest file of the selected application via the application platform 302.

The login service 303 then refers to the obtained manifest file and determines whether or not the selected application has a function that requires secure user authentication (step S1102). For example, when the application selected in the step S902 in FIG. 9A is the print 306, AdministratorSetting indicative of functions for an administrator is not described in function attributes of the manifest file 801 (see FIG. 6A) of the print 306. For this reason, the login service 303 determines that secure user authentication is unnecessary. On the other hand, when the application selected in the step S902 in FIG. 9A is the scan and send 307, AdministratorSetting indicative of functions for an administrator is described in function attributes of the manifest file 802 of the scan and send 307. Thus, the login service 303 determines whether or not secure user authentication is necessary by way of steps S1103 and S1104. It should be noted that the steps S1103 and S1104 are the same as the steps S1001 and S1002 in FIG. 10.

According to the second embodiment described above, even when for an application that does not have an administrator function, simple user authentication+secure user authentication is set in the user authentication table 503, a secure user authentication screen can be inhibited from being uselessly displayed. As a result, an administrator can set simple user authentication+secure user authentication as a user authentication method for an arbitrary application without caring about whether or not the application has an administrator function.

A description will now be given of a third embodiment of the present invention.

Although in the description of the first and second embodiments described above, authorities of users are divided into a general user and an administer using the user information table 501 in FIG. 8A, authorities of users may be divided based on authorities to use functions which the MFP 101 has. For example, a color print function is subjected to access restriction on a user-by-user basis, information indicative of whether color printing is enabled or disabled is role information on users. When the user information table 502 shown in FIG. 8B is used, information indicative of whether color printing is enabled or disabled is registered as role information.

Figure 12:
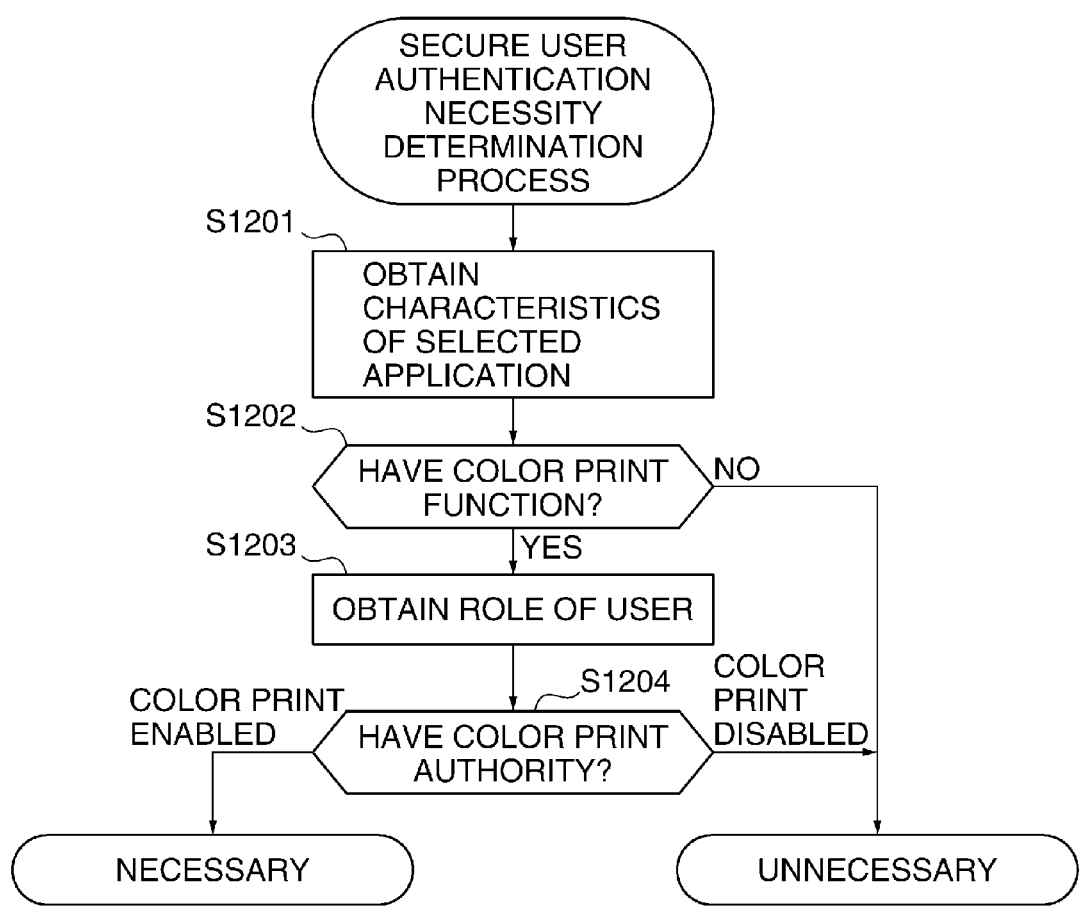
FIG. 12 is a flowchart showing in detail a process in which whether or not secure user authentication is necessary is determined according to a third embodiment of the present invention.

FIG. 12 is a flowchart showing in detail a process in which whether or not secure user authentication is necessary is determined according to the third embodiment of the present invention. This process is a detailed process in the step S914 in FIG. 9B. In this process, the user information table 502 in FIG. 8B and the user authentication setting table 504 in FIG. 8D are used, and the default role is indicative of color printing disabled. The user authentication setting table 503 and the user authentication setting table 504 differ in that for print as an application, simple user authentication is set in the user authentication setting table 503, and simple user authentication+secure user authentication is set in the user authentication setting table 504.

For example, when the print 306 or the scan and send 307 is selected in the step S902 in FIG. 9A, the login service 303 goes to the step S914 by way of the steps S912 and S913 because simple user authentication+secure user authentication is set for those applications.

Referring to FIG. 12, the login service 303 obtains a manifest file of the application selected in the step S902 in FIG. 9A via the application platform 302 (step S1201: characteristic obtaining unit).

The login service 303 then refers to the obtained manifest file and determines whether or not the selected application has a color print function which is an access restricted function (step S1201). When the selected application does not have the color print function (NO in the step S1201; for example, the scan and send 307), the login service 303 determines that secure user authentication is unnecessary. On the other hand, when the selected application has the color print function (YES in the step S1201; for example, the print 306), the login service 303 refers to the user information table 502 and obtains role information on the user identified in the step S913 (step S1203).

The login service 303 then determines whether or not a security strength of an authority indicted by the obtained role information on the user is higher than the default role (step S1204). In the present embodiment, because the default role is indicative of color print disabled, it is determined whether or not the role information on the user obtained in the step S1203 is indicative of color print disabled. When the obtained role information on the user is indicative of color print disabled, the login service 303 determines that secure user authentication is unnecessary. On the other hand, when the obtained role information on the user is indicative of color print enabled, the login service 303 determines that secure user authentication is necessary.

According to the third embodiment described above, even when simple user authentication+secure user authentication is set in the user authentication setting table 504 with respect to an application having no function targeted for access restriction, a secure user authentication screen can be inhibited from being uselessly displayed. As a result, an administrator can set simple user authentication+secure user authentication as a user authentication method for an arbitrary application without caring about whether or not each application has a function targeted for access restriction. Further, by performing only simple user authentication, a user having the same role as the default role can use a personalizing function which each application has.

In the present embodiment, user authentication is performed according to settings before the application platform 302, the login service 303, and the menu 304 display application screens. As a result, simple user authentication and secure user authentication are used, and it is thus unnecessary to add modifications relating to user authentication to applications.

Although in the first to third embodiments described above, user authentication using a user name and a password is taken as an exemplary secure user authentication method, the present invention is not limited to this, but it goes without saying that an authentication method using IC card or biological information may be used.

Moreover, although in the embodiments described above, the present invention is applied to an image processing apparatus such as an MFP, it goes without saying that the same effects can be obtained even by applying the present invention to an information processing apparatus such as a cellular phone such as a smartphone or a portable terminal.

Although in the first to third embodiments described above, there are two types of user information tables, the present invention is not limited to this, but these two types of user information tables may be combined into one user information table. Moreover, although in the first to third embodiments described above, there are two types of user authentication setting tables, the present invention is not limited to this, but these two types of user authentication setting tables may be combined into one user authentication setting table.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-132746 filed Jun. 25, 2013, which is hereby incorporated by reference herein in its entirety.

What is claimed is:

1. An image processing apparatus comprising:
a processor connected to a memory, the processor and memory configured to:
accept, via a user selection screen which displays one or more items corresponding to user identifiers which are registered with the image processing apparatus, a selection of an item corresponding to a user identifier among the displayed one or more items corresponding to the user identifiers, without an input of user authentication information;
obtain an authority of a user corresponding to the user identifier corresponding to the selected item;
display, in a case where an obtained authority of the designated user is a first authority, a user authentication screen which allows a user to input the user authentication information and also allows the user to skip an input of the user authentication information;
allow, in a case where the obtained authority of the designated user is the first authority and an authentication information inputted via the user authentication screen is succeeded, the user to use a first function;

allow, in a case where the obtained authority of the designated user is the first authority and an input of the user authentication information via the user authentication screen is skipped, the user to use a second function personalized for the designated user and not allow the user to use the first function; and allow, in a case where the obtained authority is a second authority, the user to use the second function personalized for the designated user, without displaying the user authentication screen for inputting the user authentication information, wherein in a case where the obtained authority is the second authority, the user is not allowed to use the first function.

2. The image processing apparatus according to claim 1, wherein the image processing apparatus is capable of executing a plurality of applications, and the processor and memory are further configured to store a correspondence relationship between each of the plurality of applications and processes including an accepting process of accepting designation of a user and the authentication process using the user authentication inputted via the user authentication screen.

3. The image processing apparatus according to claim 1, wherein the image processing apparatus is capable of executing an application, and the processor and memory are further configured to:

detect a selection of an application;

obtain characteristics of the selected application; and determine, based on the obtained characteristics of the application, whether or not the authentication process using the user authentication information inputted via an input screen is necessary for the selected application;

allow, in a case where it is determined that the authentication process is unnecessary for the selected application, the user to use the selected application personalized for the user corresponding to the selected user identifier without input of the user authentication information; and display, in a case where it is determined that the authentication process is necessary for the selected application, one of the user selection screen which accepts the designation of a user without input of the user authentication information and the input screen which accepts an input of the user authentication information.

4. The image processing apparatus according to claim 3, wherein the obtained characteristics are included in a manifest file of the selected application.

5. The image processing apparatus according to claim 1, wherein an accepting process of accepting designation of a user is a process in which the user is identified without using a password.

6. The image processing apparatus according to claim 1, wherein the authentication process is a process in which the user is identified using a password.

7. The image processing apparatus according to claim 6, wherein in the authentication process, the user authentication screen is displayed on a display of the image processing apparatus and allows an input of a user name and a password.

8. A control method for an image processing apparatus comprising:

an accepting step of accepting, via a user selection screen which displays one or more items corresponding to user identifiers which are registered with the image processing apparatus, a selection of an item corresponding to a user identifier among the displayed one or more items corresponding to the user identifiers, without an input of user authentication information;

an obtaining step of obtaining an authority of a user corresponding to the user identifier corresponding to the selected item;

a displaying step of displaying, in a case where an obtained authority of the user corresponding to a selected user identifier is a first authority, a user authentication screen which allows a user to input the user authentication information and also allows the user to skip an input of the user authentication information;

a first allowing step of allowing, the obtained authority of the user corresponding to the selected user identifier is the first authority and in a case where an authentication process using user authentication information inputted via the user authentication screen is succeeded, the user to use a first function;

a second allowing step of allowing, in a case where the obtained authority of the user corresponding to the selected user identifier is the first authority and an input of the user authentication information via the user authentication screen is skipped, the user to use a second function personalized for the user corresponding to the selected user and not allow the user to use the first function; and a third allowing step of allowing, in a case where the obtained authority is a second authority, the user to use the second function personalized for the user corresponding to the selected user, without displaying the user authentication screen for inputting the user authentication information, wherein in a case where the obtained authority is the second authority, the user is not allowed to use the first function.

9. A non-transitory computer-readable storage medium storing a program for causing an image processing apparatus to implement a control method, the control method comprising:

an accepting step of accepting, via a user selection screen which displays one or more items corresponding to user identifiers which are registered with the image processing apparatus, a selection of an item corresponding to a user identifier among the displayed one or more items corresponding to the user identifiers, without an input of user authentication information;

an obtaining step of obtaining an authority of a user corresponding to the user identifier corresponding to the selected item;

a displaying step of displaying, in a case where an obtained authority of the user corresponding to a selected user identifier is a first authority, a user authentication screen which allows a user to input the user authentication information and also allows the user to skip an input of the user authentication information;

a first allowing step of allowing, the obtained authority of the user corresponding to the selected user identifier is the first authority and in a case where an authentication process using user authentication information inputted via the user authentication screen is succeeded, the user to use a first function;

a second allowing step of allowing, in a case where the obtained authority of the user corresponding to the selected user identifier is the first authority and an input of the user authentication information via the user authentication screen is skipped, the user to use a second function personalized for the user corresponding to the selected user and not allow the user to use the first function; and a third allowing step of allowing, in a case where the obtained authority is a second authority, the user to use the second function personalized for the user corresponding to the selected user, without displaying the user authentication screen for inputting the user authentication information, wherein in a case where the obtained authority is the second authority, the user is not allowed to use the first function.

10. The image processing apparatus according to claim 1, wherein the first function and the second function are provided by executing one application of the image processing apparatus.

11. The image processing apparatus according to claim 1, wherein the processor and memory are further configured to: display the user selection screen for designating a user, wherein in a case where the authority of the user designated via the user selection screen is the first authority, the user authentication screen is displayed, the user authentication screen being different from the screen.

12. The image processing apparatus according to claim 1, wherein in a case where the authentication process via the user authentication screen is skipped by the user, the user is allowed to use the second function personalized for the user corresponding to the selected user and is not use the first function.

13. The image processing apparatus according to claim 1, wherein the image processing apparatus is an image forming apparatus including a printing unit.

14. The image processing apparatus according to claim 1, wherein the user authentication information is a password.

* * * * *